Figure 3:
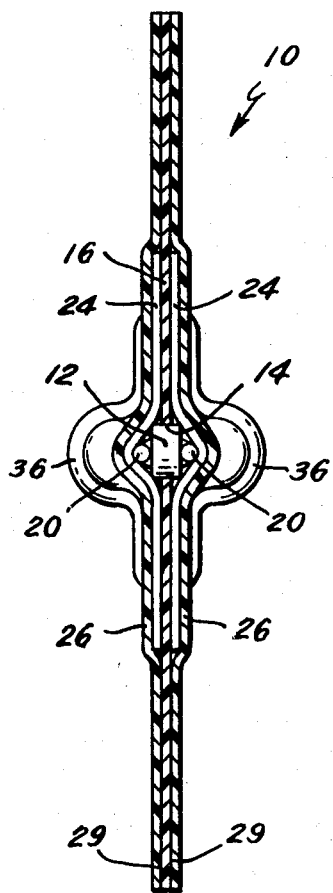

United States Patent
Waseleski, Jr. et al.

[15] 3,646,494
[45] Feb. 29, 1972

[54] ELECTRIC MOTOR PROTECTOR SENSOR

[72] Inventors: Joseph W. Waseleski, Jr., Mansfield, Mass.; Ralph E. Charnley, Edmond, R.I.

[73] Assignee: Texas Instruments Incorporated, Dallas, Tex.

[22] Filed: Jan. 23, 1970

[21] Appl. No.: 5,428

[52] U.S. Cl................................338/25, 338/26, 317/41
[51] Int. Cl.............................................H01c 7/00
[58] Field of Search.................317/41; 338/22, 23, 25, 26

[56] References Cited

UNITED STATES PATENTS 3,521,212  7/1970  Waseleski, Jr. et al. ............317/41 X
3,430,336  3/1969  Riddel...............................338/22 X Primary Examiner—Rodney D. Bennett, Jr.
Assistant Examiner—R. Kinberg
Attorney—Harold Levine, Edward J. Connors, Jr., John A. Haug, James P. McAndrews and Gerald B. Epstein

[57] ABSTRACT

An electric motor protector sensor for use in pressurized atmospheres comprises a small thermistor of low-thermal inertia which is carried in an opening in a thin, inner layer of flexible, temperature-resistant, electrically insulating material to expose portions of the thermistor on opposite sides of the thin insulating layer. Ends of lead wires are connected to these exposed thermistor portions, the lead wires extending away from the thermistor along opposite sides of the thin insulating layer to be connected at their opposite ends to the conductive cores of insulated conductors. Thin, flexible, disc-shaped foils of copper of much larger diameter or surface area than the thermistor are disposed on each side of the thin insulating layer in heat-transfer engagement with respective exposed portions of the thermistor and with portions of the lead wires, thereby to provide heat-collecting members of substantial surface area in the sensor. Outer thin layers of similar insulating material sandwich the thin insulating layer and are bonded to opposite sides of the inner insulating layer around the copper foils, thermistor and leads for sealing the sensor. Heat-shrunk tubes of insulating material are disposed in sealing relation around portions of the insulated conductors and portions of the outer insulating layers of the sensor to complete sealing of the sensor.

6 Claims, 7 Drawing Figures

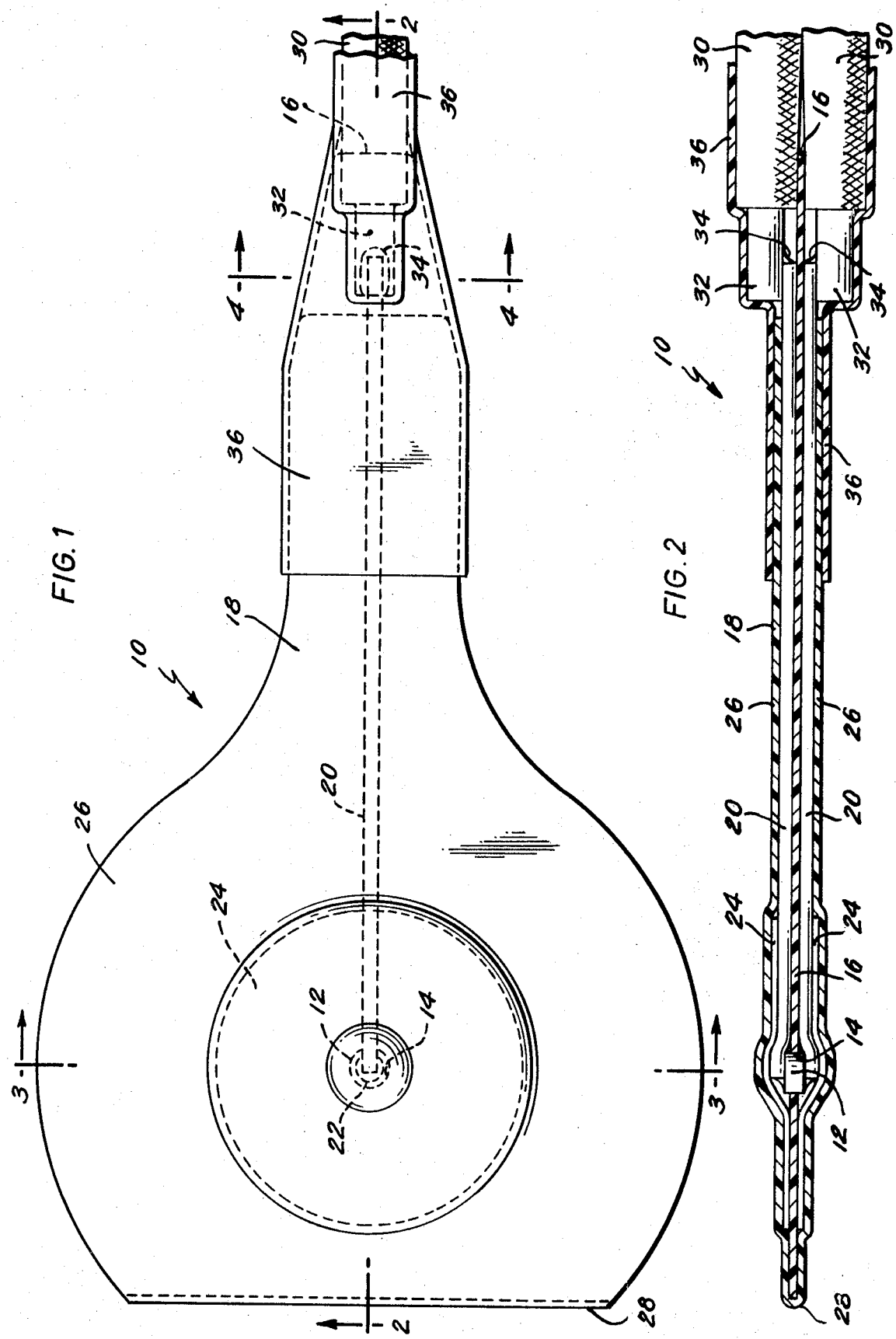

ELECTRIC MOTOR PROTECTOR SENSOR

In a known motor protection sensor in which a thermistor is disposed in an opening in a thin inner layer of insulating material to expose portions of the thermistor on opposite sides of the insulating layer, outer thin layers of similar insulating material are provided with copper foils which are deposited thereon. These outer insulating layers are arranged to sandwich the inner insulating layers, the deposited copper foils carried by the outer insulating layers being soldered to respective exposed portions of the thermistor on opposite sides of the inner insulating layer. The outer layers of the sensor are also bonded to the inner insulating layer around the copper foils for sealing the sensor. Stem portions of these deposited copper foils extend to edges of the insulating layers where they are electrically connected to appropriate conductors. In this arrangement, the copper foils not only serve as heat-collecting members but also serve as electrical leads extending from the thermistor. When these known sensors are located within motor windings, the heat-collecting copper fils readily conform to the winding configuration and cooperate with low thermal inertia of the thermistor to permit very rapid response of the sensor to rising motor temperatures. This prior art sensor therefore significantly reduces overshoot of motor heating when the sensor indicates that motor temperature has risen to the point where motor operation should be interrupted. However, these known sensors are frequently used in pressurized freon atmospheres and the like, in refrigeration motors for example, and it is found that, despite the sealed nature of the sensor, some pressurized freon tends to enter the sensor between the outer layers of the sensor-insulating material. If a temporary loss of gas condition thereafter occurs in the sensor environment, it is found that rapid expansion of the freon gas trapped within the sensor tends to separate the outer insulating layers of the sensor with resulting fracture of the electrical connection between the thermistor and the copper foils deposited on the insulating layers. Upon restoration of the desired pressurized atmosphere around the sensor, it is found that electrical connections between the copper foils and the thermistor are frequently not restored and the sensor becomes inoperative. Where the sensors are positioned within the motor winding during assembly of the motor, this failure of the sensor results in loss of the entire motor winding.

It is an object of this invention to provide a novel and improved electric motor protection sensor; to provide such a sensor which is characterized by very rapid response to rising motor winding temperatures; to provide such a sensor which is useful in pressurized atmosphere without risk of electrical failure upon the occurrence of loss of pressure in the sensor environment; and to provide such a sensor which is of simple, reliable, rugged and inexpensive construction.

Figure 4:
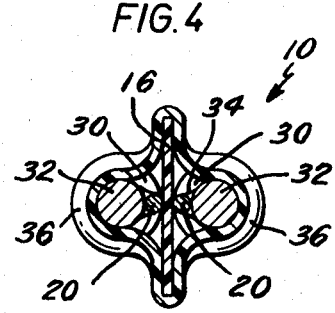
Figure 5:
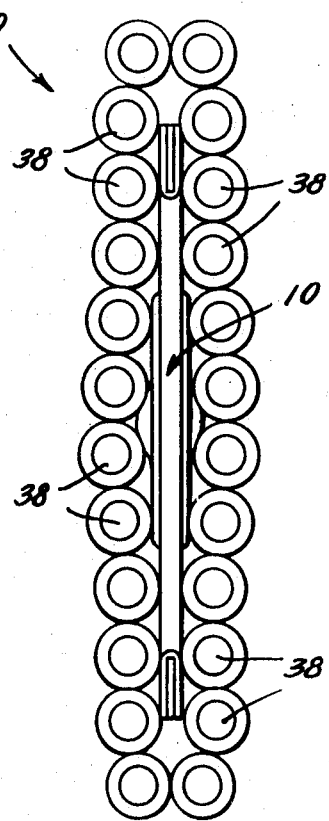
Figure 6:
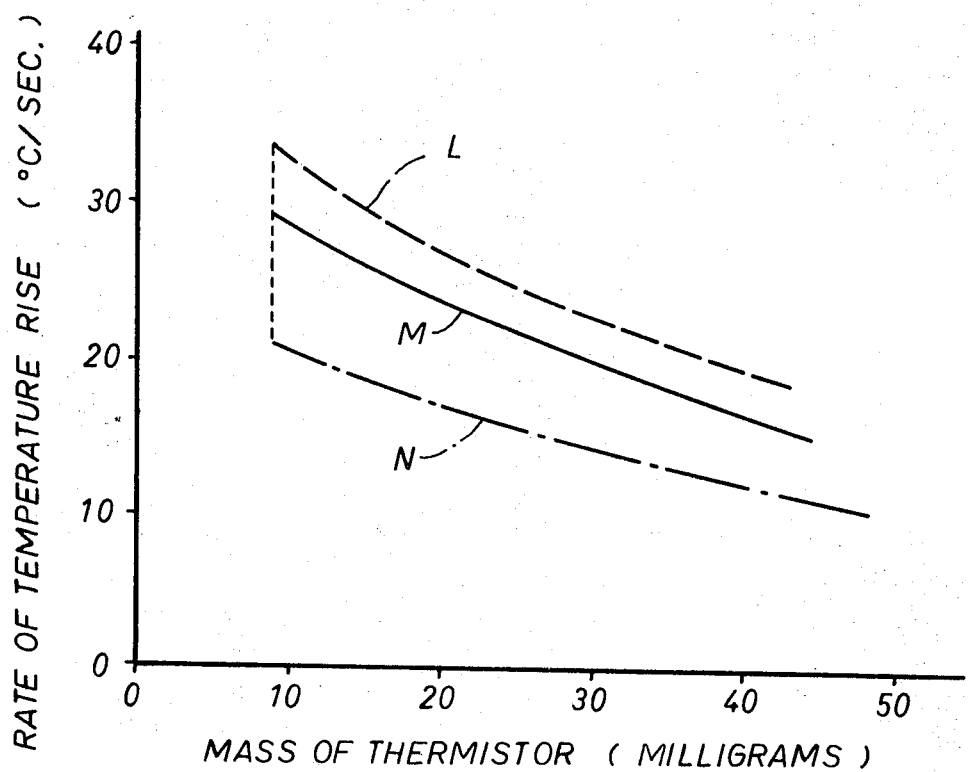
Figure 7:
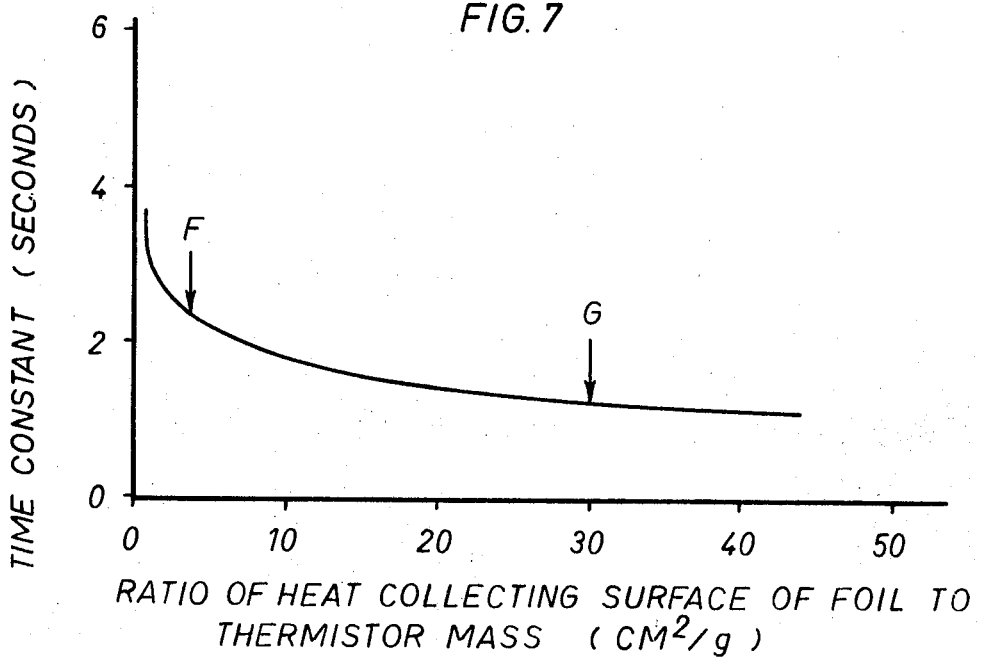

Other objects, advantages and details of the motor protection sensor of this invention appear in the following detailed description of preferred embodiments of the invention, the description referring to the drawings in which:

FIG. 1 is a plane view of the sensor of this invention;
FIG. 2 is a section view along line 2—2 of FIG. 1;
FIG. 3 is a section view along line 3—3 of FIG. 1;
FIG. 4 is a section view along line 4—4 of FIG. 1;
FIG. 5 is a diagrammatic view illustrating use of the sensor within a motor winding; and
FIGS. 6 and 7 are graphs illustrating operating characteristics of the sensor.

Referring to the drawings, 10 in FIGS. 1–5 indicates the novel and improved electric motor protection sensor of this invention which is shown to include a thermistor 12 which preferably comprises a small pellet of semiconductive material having a selected positive or negative temperature coefficient of resistance. Preferably, the thermistor is adapted to display gradually changing electrical resistance in response to change of thermistor temperature within a selected range and is then adapted to display a much more rapid change in electrical resistance in response to further change of temperature. Preferably, for example, the thermistor embodies a lanthanide-doped barium titanate, barium strontium titanate, barium lead titanate or the like. The size of the thermistor is preferably very small so that the thermistor displays low thermal inertia but the size of the thermistor in the sensor can vary within the scope of this invention in accordance with the electrical parameters of the motor control system in which the sensor is to be used. A practical thermistor useful in sensors finding wide commercial application comprises a pellet of lanthanide-doped barium titanate 0.050 inches in length and 0.070 inches in diameter. However, other thermistors of the same material ranging in length from 0.040 to 0.060 inches and ranging in diameter from 0.050 to 0.080 inches are also useful in many applications.

In accordance with this invention, the thermistor 12 is held in a small opening 14 in a thin layer 16 of electrical insulating material. This material is capable of withstanding substantially elevated temperatures to which the material might be exposed in an overheating electric motor. For example, a preferred insulating material for this purpose comprises a polyimide resin such as is sold commercially under the trade name "Kapton." Other materials useful in the insulating layer 16 include polyethylene tetraphthalate such as is sold under the trade name "Mylar" or a fluorinated aliphatic hydrocarbon such as tetrafluoroethylene sold under the trademark "Teflon." In a practical embodiment of the sensor of this invention, the thin inner layer 16 of the sensor preferably has a thickness in the range from approximately 2–6 mils. The inner insulating layer 16 of the sensor is preferably of generally round configuration having a radially extending stem portion as indicated at 18 in FIG. 1.

In accordance with this invention, opposite end portions of the thermistor 12 are exposed at either side of the thin insulating layer 16 in the sensor, and thin, elongated leads 20 are electrically connected to respective exposed portions of the thermistor to extend away from the thermistor along opposite sides of the thin insulating layer 16. Preferably for example, the leads 20 comprise No. 28 Gage copper wires and are soldered as indicated at 22 by use of any conventional lead-tin or gold-tin solder material. An appropriate solder for example comprises a gold-tin eutectic material containing 80 percent gold and 20 percent tin.

In accordance with this invention, a pair of copper foils 24 of relatively larger diameter than the thermistor 12 are disposed on respective sides of the thin insulating layer 16 in heat-transfer engagement with the thermistor 12 and with portions of the thermistor leads 20. For example, each of the copper foils preferably has a thickness in the range from 0.40 to 0.75 mils and has a diameter of approximately 0.50 inches.

In accordance with this invention, outer layers 26 of electrically insulating material similar to the material embodied in the thin inner insulating layer 16 are superimposed upon respective opposite sides of a thin insulating layer 16 as shown. Preferably, for example, the outer insulating layers 26 are embodied in a single sheet of material which is folded along an edge indicated at 28 in FIGS. 1 and 2 so that portions of the sheet falling upon each side of the thin insulating layer 16 constitute the outer insulating layers 26 of the sensor 10. In this way, the outer insulating layers 26 sandwich the inner insulating layer 16, thermistor 12, the leads 20, and the copper foils 24 between the outer insulating layers. The outer insulating layers 26 are then bonded to the inner insulating layer 16 of the sensor around the leads 20 and the copper foils 24 as indicated at 29 in FIG. 3 for sealing the inner and outer insulating layers together. An appropriate bonding material useful for bonding these insulating materials together comprises a heat-sealable fluorinated aliphatic hydrocarbon such as it is commonly sold under the trademark "Teflon."

If desired, in the preferred embodiment of this invention, a pair of insulated conductors 30 having conductive cores 32 are disposed on respective sides of the stem portion of the thin inner insulating layer 16 with the conductive cores thereof secured in electrically conductive relation to the ends of the thermistor leads 20 oppositely of the thermistor 12. For example, the cores of the insulated conductors are preferably soldered to respective leads 20 within any conventional lead-tin solder or the like as indicated at 34 in FIGS. 1, 2 and 4.

In a preferred embodiment of this invention, a tube or sleeve 36 of heat-shrinkable, electrically insulating material is fitted around portions of the insulated conductors 30 and is fitted over the stem portions of the insulating layers 16 and 26 of the sensor 10, the tube 36 then being heated for shrinking the tube into sealing relation to the insulated conductors 30 and to the insulating layers of the sensor 10. A preferred material for this sleeve 36 comprises cross-linked polyethylene tetraphthalate which is sold under the trademark "Mylar." In assembling the sensor 10, the sleeve 36 is fitted over the stem portions of the insulating layers 16 and 26. The sleeve is then folded back on itself to permit access to the ends of the leads 20 located at the ends of the insulating layer stem portions. The insulated conductors 30 are then positioned over the ends of the leads 20 and the conductive cores thereof are soldered to the leads 20 as indicated at 34. The sleeve 36 is then unfolded from itself to extend the sleeve over the insulated portions of the insulated conductors 30. Heating of the insulating sleeve then serves to seal the sleeve to the insulated conductors and to the stem portions of the sensor insulating layers. Other sleeve materials which may be cross-linked, expanded and then shrunk by heating are polyamide resins such as are sometimes sold under the trade name "Nylon" or the material described above as "Teflon."

The sensor 10 above described has a number of advantages as illustrated in FIG. 5. That is, because the sensor is thin and flexible, the sensor interleaves readily between insulated convolutions 38 of a motor winding 40 shown in FIG. 5. Thus the copper foils 24 of the sensor achieve an efficient heat-exchange relationship with the windings of various types of motors and readily conduct heat from the windings, the heat-collecting function of the copper foils permitting conduction of a substantial and uniform amount of heat to portions of the thermistor engaged by the foils. In general, increase of the ratio of the heat collecting surfaces of the copper foils relative to the thermal mass of the thermistor 12 to be heated is highly desirable. If the heat-collecting area provided in the sensor were too small, the thermistor would not have enough heat delivered to it to drive its temperature up as rapidly as might be necessary to closely follow the rapidly rising temperature of the motor winding. There would thus be a lag between the arrival of the motor winding at a dangerous temperature and the sensing of that temperature by the thermistor. This lag could permit the motor winding to overshoot its maximum desirable temperature and could result in overheating of the motor winding before motor protective devices operably connected with the sensor could interrupt motor operation. Equally important, if only the small surface area of the thermistor were available to perform a heat-collecting function, the positioning of the thermistor directly between convolutions of a motor winding could not be achieved with a consistent degree of thermal contact with the motor winding. That is, the small thermistor surfaces might be positioned directly adjacent winding convolutions or might fall in interstices between the convolutions, whereby the sensing characteristics of the sensor relative to the winding would vary from motor to motor. In a desirable construction, desirable proportions for the sensor include use of a thermistor 0.070 inches in diameter and 0.050 inches in length between conductive copper foils 24 of approximately 0.500 inches in diameter, the copper foils being about 0.4 mils thick and being sandwiched between outer insulating layers 26 of the sensor which are approximately 1.125 inches in diameter. Desirably the outer insulating layers of the sensor have a thickness of from 2 to 6 mils. These proportions of sensor components provide the highly desirable combination of small thermistor mass to achieve low thermal inertia and large heat-collecting surfaces provided by the copper foils, the foils assuring appropriate averaging of thermal contact within a motor winding to avoid any "scatter effect" such as might result from poor positioning of the small thermistor within the winding. Note that a thermistor of smaller size than above described could be difficult to solder and might provide a choke effect on heat transfer from the motor winding to the thermistor, which choke effect might tend to increase the time constant of the thermistor.

For example, as is illustrated in FIG. 6, when the mass of the thermistor is small, the thermistor can display a very rapid rate rise in temperature as indicated by curve M in FIG. 6. However, when the thermistor size is small, the thermal contact which can be obtained between the thermistor and the convolutions of a motor winding becomes increasingly variable so that as illustrated by curves L and N in FIG. 6, the same small thermistor displays variable response to increasing motor winding temperature depending upon the degree of thermal contact between the thermistor and the winding. That is, where the thermistor is very small, the "scatter effect" encountered in properly positioning the thermistor within a motor winding is substantial and difficulty is encountered in utilizing the thermistor to follow a particular rate of motor winding temperature rise. However, as is illustrated in FIG. 7, the use of copper foils to perform a heat-collecting function for a thermistor of low thermal inertia permits stabilizing of the time constant of the sensor and reduces variation in time constant which results from variations in positioning of the sensor within a motor winding. That is, while a small thermistor utilized without the heat-collecting copper foils of the sensor of the present invention might achieve a time constant as indicated at point F on the curve of FIG. 7, the small thermistor would be subject to the large scatter effect illustrated in FIG. 6. In the sensor of the present invention, where the ratio of a heat-collecting surface to the thermistor mass is substantially greater, the time constant of the thermistor tends to be somewhat lower, as indicated at point G in FIG. 7, but is still quite high. In addition, the sensor 10 of this invention, having a much higher ratio of heat-collecting surface to thermistor mass displays much less scatter effect when positioned within a motor winding. That is, the thermistor of the present invention achieves a highly desirable combination of low thermal inertia and high heat-collecting surface which assures that the sensor is readily positioned within a motor winding to achieve a high and consistent thermistor time constant for permitting the sensor to follow rapidly increasing motor winding temperature in a consistent manner.

The sensor of the present invention has the additional advantage that, should the sensor be utilized in a pressurized environment, the sensor is not adversely effected by temporary loss of pressure conditions in the environment. That is, if pressurized gas from the sensor environment should enter between the outer insulating layers of the sensor despite the sealed nature of the sensor, a temporary loss of gas condition in the sensor environment might permit the gas trapped between the sensor-insulating layers to expand the layers for moving the copper foils 24 out of engagement with the thermistor 12. However, the electrical connection between the thin, elongated leads 20 and the thermistor 12 would be uneffected by such expansion of the insulating sensor layers. Thus, upon restoration of the pressurized atmosphere in the sensor environment, the outer insulating layers of the sensor would be restored to their initial position, thereby restoring proper heat-transfer engagement of the copper foils 24 with the thermistor and with the leads 20 without requiring any restoration of electrical connection to the thermistor. In this way, it is found that the sensor 10 of this invention is especially adapted for use in pressurized environments.

It should be understood that a preferred embodiment of this invention has been described by way of illustration but that all modifications and equivalents thereof which fall within the scope of the appended claims are included within the scope of this invention. For example, although the leads 20 are shown to be of round configuration, these leads could be narrow and flat throughout their length or could be flattened at their point of connection to the thermistor 12 and conductive cores 32. Further, although the thermistor 12 is shown to be fitted within an opening in the inner insulating layer 16 of the sensor, a convenient method of thermistor assembly mounts the thermistor 12 extending through central apertures in two superimposed small discs of insulating material. The leads 20 are then attached to portions of the thermistor exposed on opposite sides of the pair of insulating discs. This assembly is then disposed so that the thermistor extends through an aperture 14 in the thin insulating layer 16 with one of the small insulating discs being disposed at either side of the thin insulating layer 16 for retaining the thermistor in the aperture 14, the leads 20 extending along each side of the layer 16. Other modifications which might assist in assembly of the sensor 10 are also within the scope of this invention if they fall within the scope of the appended claims.

I claim:

1. A sensor comprising a thermistor material having selected temperature coefficient of resistance properties; an inner layer of flexible, electrically insulating material having an opening containing said thermistor and exposing portions of said thermistor of selected area on opposite sides of said inner layer; a pair of elongated electrically conductive lead members which are secured in electrically conductive relation to said thermistor portions exposed on respective opposite sides said inner layer and which extend from said thermistor portions along respective opposite sides of said inner layer of flexible electrically insulating material toward an edge of said inner layer of material; a pair of discrete, flexible foils of heat-conducting material of relatively much greater area than said thermistor portions disposed on respective opposite sides of said inner layer in heat-transfer engagement with said thermistor portions and portions of said respective leads and in physical engagement with portions of said inner layer around said inner layer opening; and a pair of outer layers of flexible, electrically-insulating material disposed on respective opposite sides of said inner layer, said outer layers being bonded to said inner layer around said foils and leads for sealing said foils and thermistor therebetween.

2. A sensor according to claim 1 wherein the thickness of each foil is in the range from 0.40 to 0.75 mils.

3. A sensor according to claim 2 wherein the thickness of said inner and outer insulating layers is in the range from 2.0 to 6.0 mils.

4. A sensor according to claim 3 having electrical conductors with conductive cores and electrically insulating coatings on the conductive cores arranged so that the conductive cores of the insulated conductors are secured in electrically conductive relation to respective leads adjacent an edge of said inner layer.

5. A sensor as set forth in claim 4 having an insulating sleeve shrunk in sealing relation to said insulated conductors and said outer sensor layers for sealing said sensor to said conductors.

6. A sensor as set forth in claim 5 wherein said thermistor displays a selected temperature coefficient of resistance over a selected temperature range and displays a relatively different temperature coefficient of resistance over another selected temperature range.

* * * * *